United States Patent [19]
Kitazawa et al.

[11] Patent Number: 6,147,814
[45] Date of Patent: Nov. 14, 2000

[54] ZOOM LENS BARREL

[75] Inventors: Hideto Kitazawa, Hachioji; Shigeo Hayashi, Okaya, both of Japan

[73] Assignee: Olympus Optical Co., Ltd., Tokyo, Japan

[21] Appl. No.: 09/141,133

[22] Filed: Aug. 27, 1998

[30] Foreign Application Priority Data

Sep. 2, 1997 [JP] Japan .................................. 9-237413

[51] Int. Cl.[7] .................................................. G02B 15/14
[52] U.S. Cl. ............................................ 359/699; 359/701
[58] Field of Search .................................. 359/694, 699, 359/700, 701, 704, 823

[56] References Cited

U.S. PATENT DOCUMENTS

| | | | |
|---|---|---|---|
| 5,461,443 | 10/1995 | Nakayama et al. ................... | 354/195.1 |
| 5,467,224 | 11/1995 | Nomura ................................. | 359/694 |
| 5,661,609 | 8/1997 | Asakura et al. ....................... | 359/826 |
| 5,739,962 | 4/1998 | Asakura et al. ....................... | 359/700 |

FOREIGN PATENT DOCUMENTS 4-52628  2/1992  Japan .

Primary Examiner—Ricky Mack
Attorney, Agent, or Firm—Volpe and Koenig, P.C.

[57] ABSTRACT

A zoom lens barrel is a lens barrel having a plurality of lens groups that change intervals in the direction of an optical axis at the time of a zooming operation and move in one-piece toward the optical axis at the time of a focusing operation thereby fixing the mutual intervals in the direction of the optical axis. Furthermore, the zoom lens barrel drives a second group lens frame toward the optical axis via a cam follower by a three-dimensional cam that rotates around the optical axis at the time of the zooming operation and moves toward the optical axis at the time of the focusing operation to perform zooming or focusing. According to this zoom lens barrel, it becomes possible to make the radial size small and further to easily maintain good optical performance.

25 Claims, 12 Drawing Sheets

ZOOM LENS BARREL

BACKGROUND OF THE INVENTION

1. Field Of The Invention

The present invention relates to a drive mechanism of a zoom lens barrel.

2. Related Art Statement

Zoom lens barrels disclosed in U.S. Pat. No. 5,661,609 and U.S. Pat. No. 5,739,962 each have such structure that one lens frame between two lens frames moved at the time of focusing is provided with an end surface cam and the end surface cam is contacted to another lens frame. Furthermore, when zooming, the one lens frame is rotated to change a distance between lens groups.

Nevertheless, in each of the above zoom lens barrels, a lens frame is rotated around an optical axis by zooming. Therefore, since cores of the lenses change according to a zooming position, this is not desirable for optical performance.

SUMMARY OF THE INVENTION

The present invention is intended to solve the above problems and an object of the present invention is to provide a zoom lens barrel having a small size measured in the radial direction and a property of easily securing highly-accurate optical performance.

In a zoom lens barrel that has a plurality of lens groups that change their intervals in the direction of an optical axis at the time of zooming operation and move in a manner as though they are a one-piece assembly in the direction of the optical axis at the time of a focusing operation while keeping the intervals in the direction of the optical axis, a zoom lens barrel of the present invention comprises: a three-dimensional cam rotating at least around the optical axis at the time of a zooming operation and moving at least toward the optical axis at the time of a focusing operation; a lens frame having a cam follower contacting to an end surface of the three-dimensional cam and holding a lens group out of the plurality of lens groups; and an energizing means for energizing the lens frame toward the three-dimensional cam.

The above zoom lens barrel can drive the lens frame toward the optical axis via the cam follower by the three-dimensional cam rotating around the optical axis at the time of a zooming operation and moving toward the optical axis at the time of a focusing operation.

Other features and advantages of the present invention will be apparent from the following description and drawings.

DESCRIPTION OF THE PREFERRED EMBODIMENTS

Hereinafter, embodiments of the present invention will be described with reference to drawings.

Figure 1:
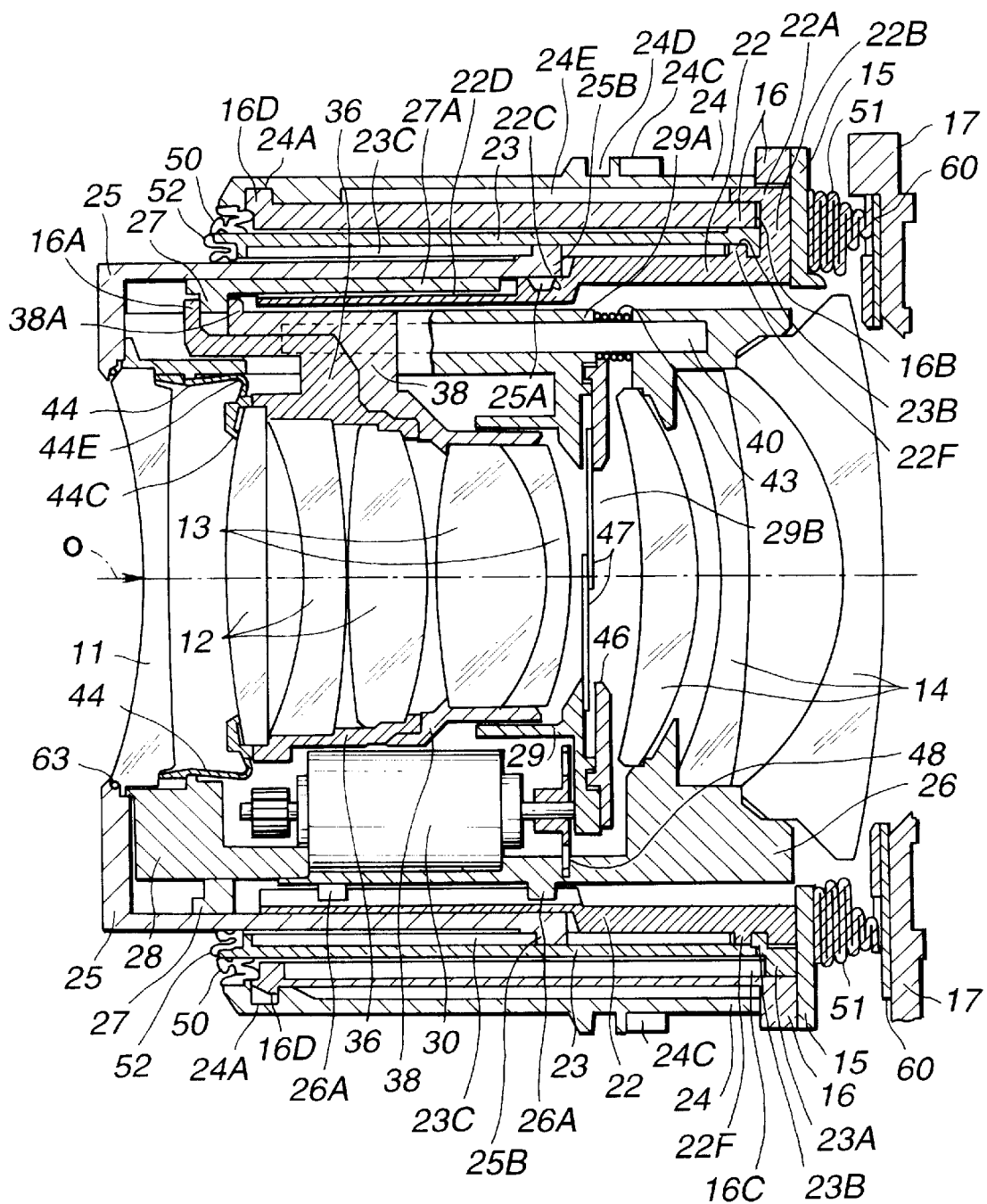
FIG. 1 is a central vertical sectional view showing a retracted state of a zoom lens barrel that is an embodiment of the present invention.
Figure 2:
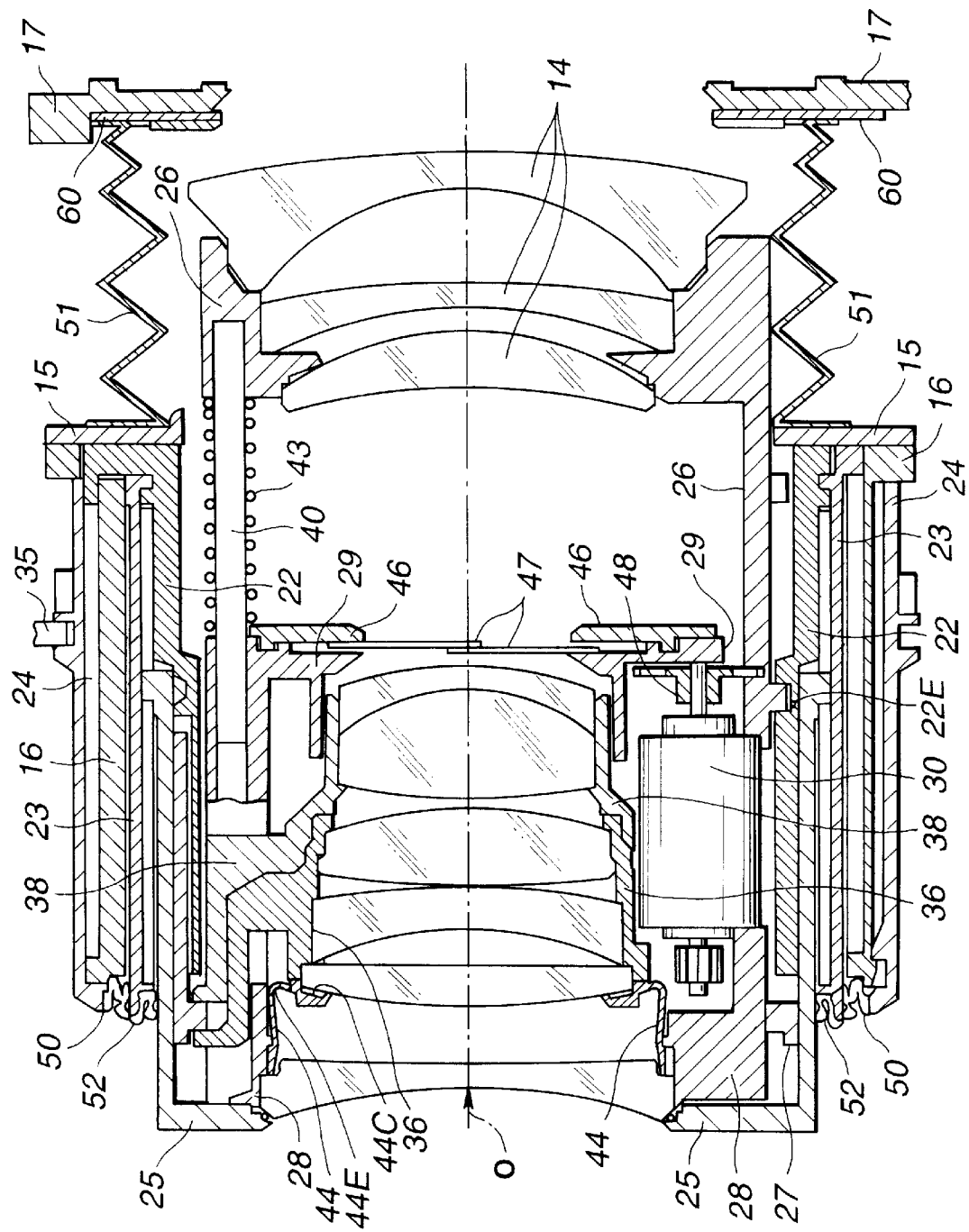
FIG. 2 is a central vertical sectional view showing a zooming-to-wide-angle-end state of the zoom lens barrel in FIG. 1.
Figure 3:
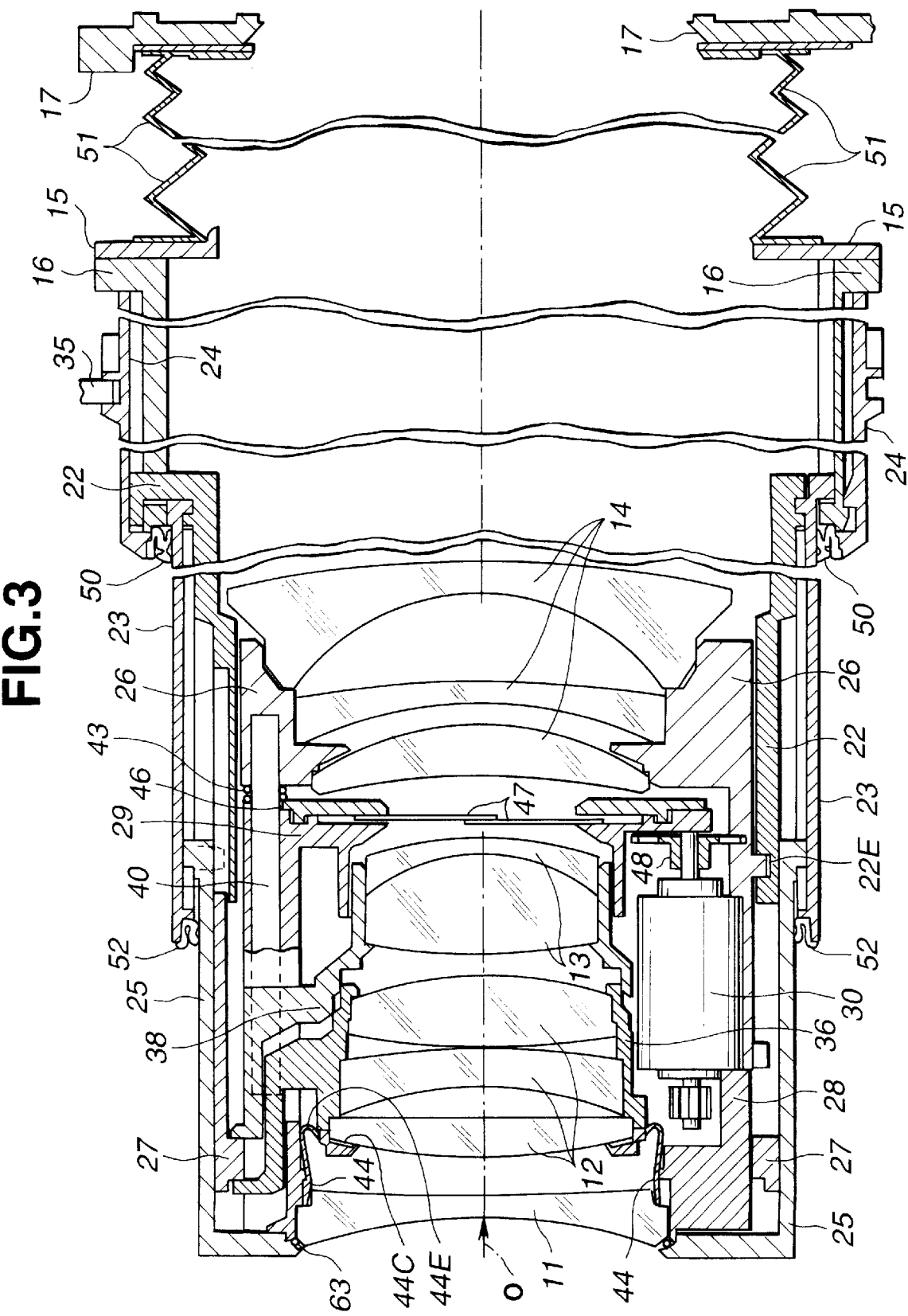
FIG. 3 is a central vertical sectional view showing a zooming-to-telephoto-end state of the zoom lens barrel in FIG. 1.
Figure 4:
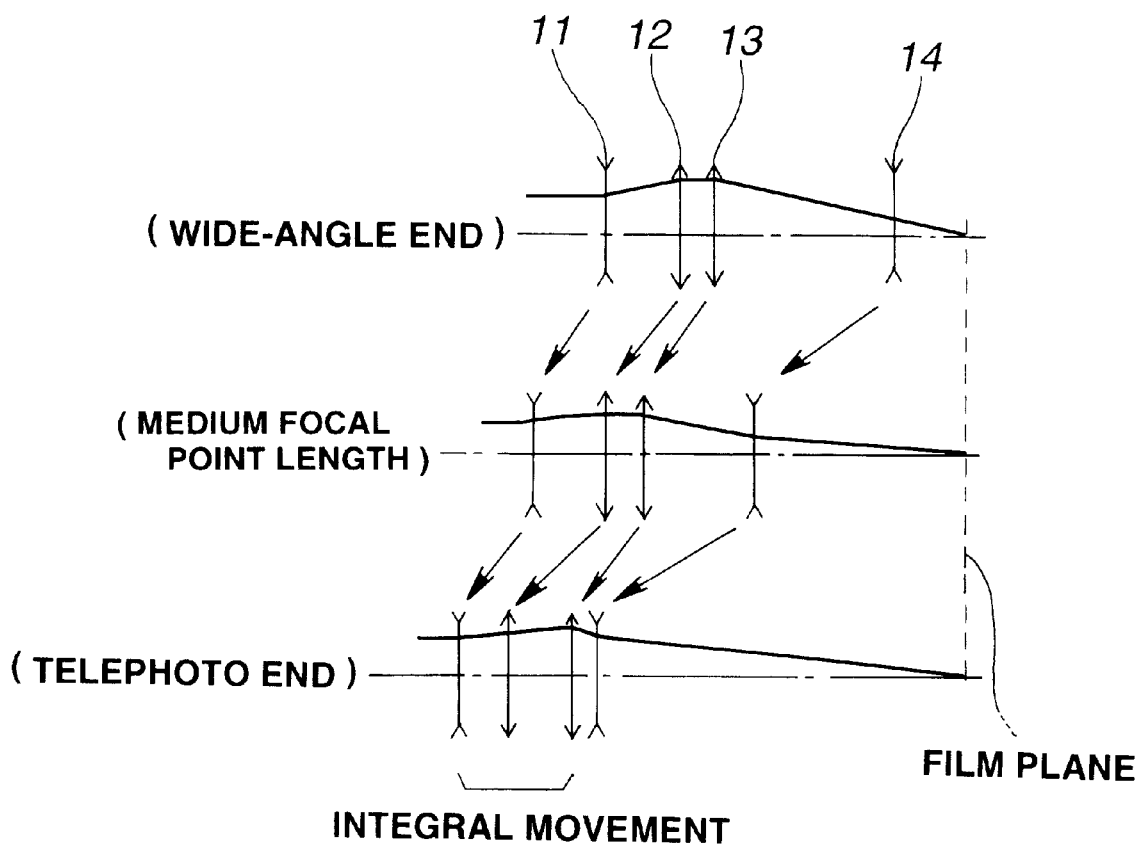
FIG. 4 is a schematic diagram showing the movement of each lens group at the time of a zooming operation of the zoom lens barrel in FIG. 1.
Figure 5:
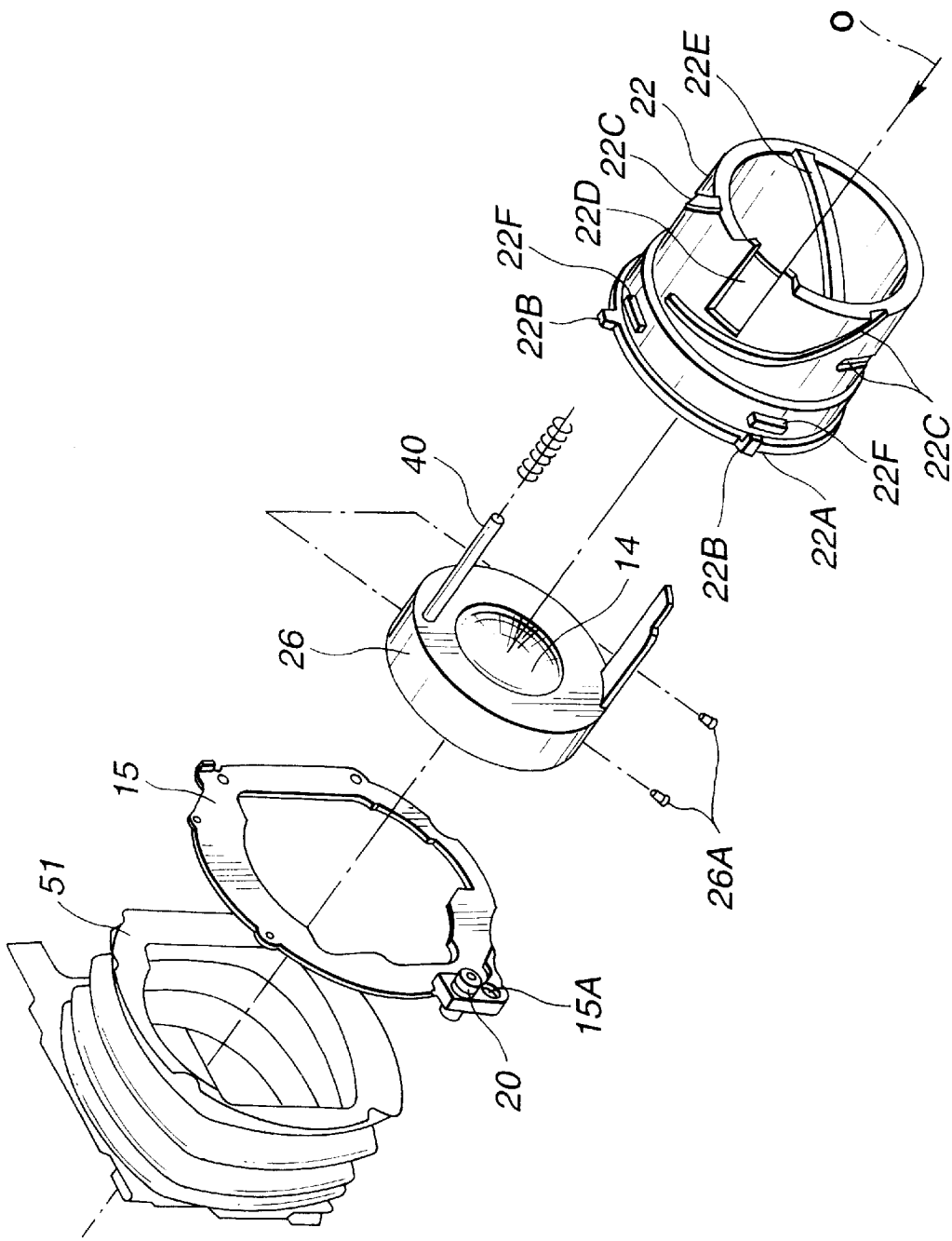
FIG. 5 is a part of an exploded perspective view of the zoom lens barrel in FIG. 1.
Figure 6:
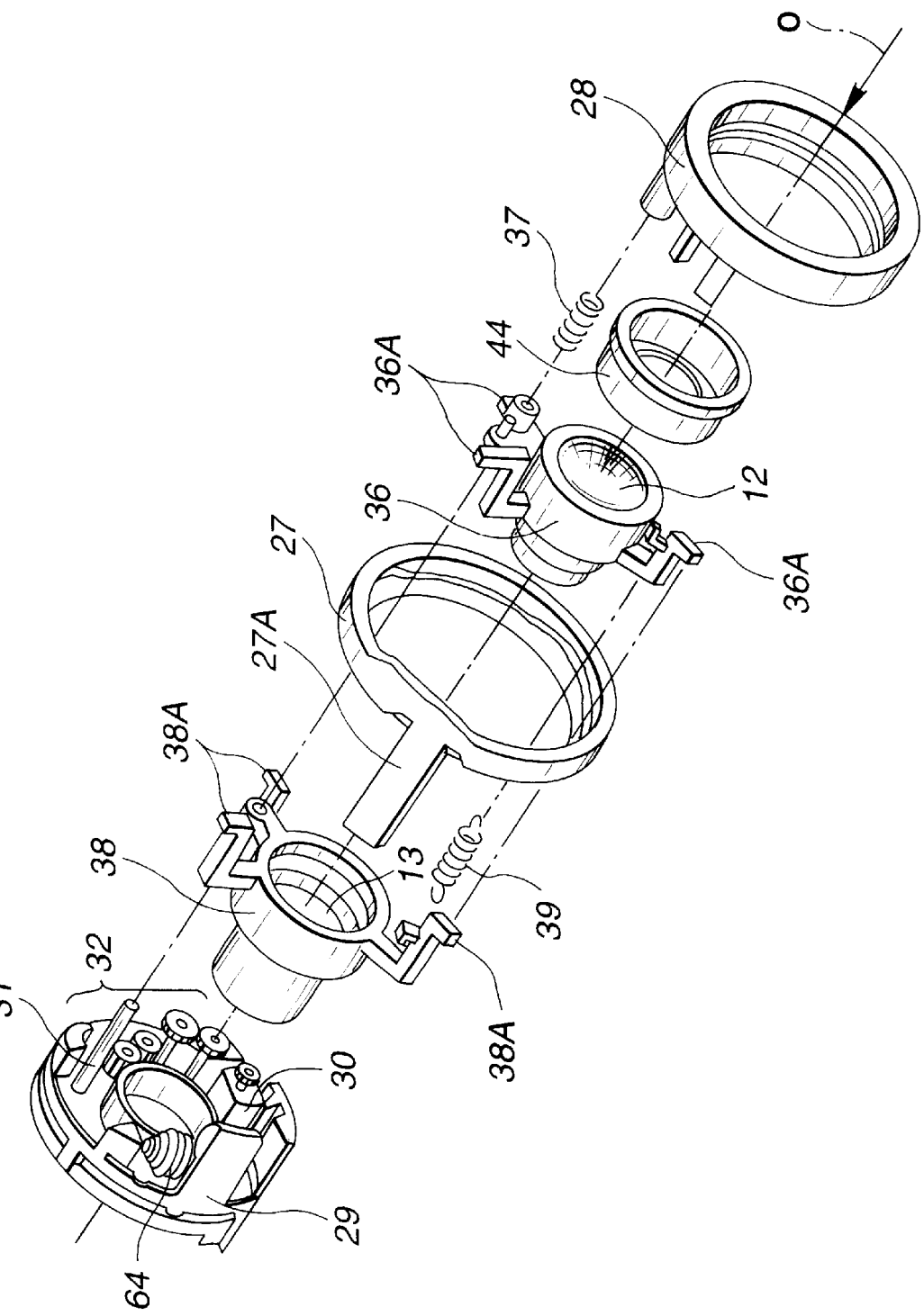
FIG. 6 is a part of an exploded perspective view of the zoom lens barrel in FIG. 1.
Figure 7:
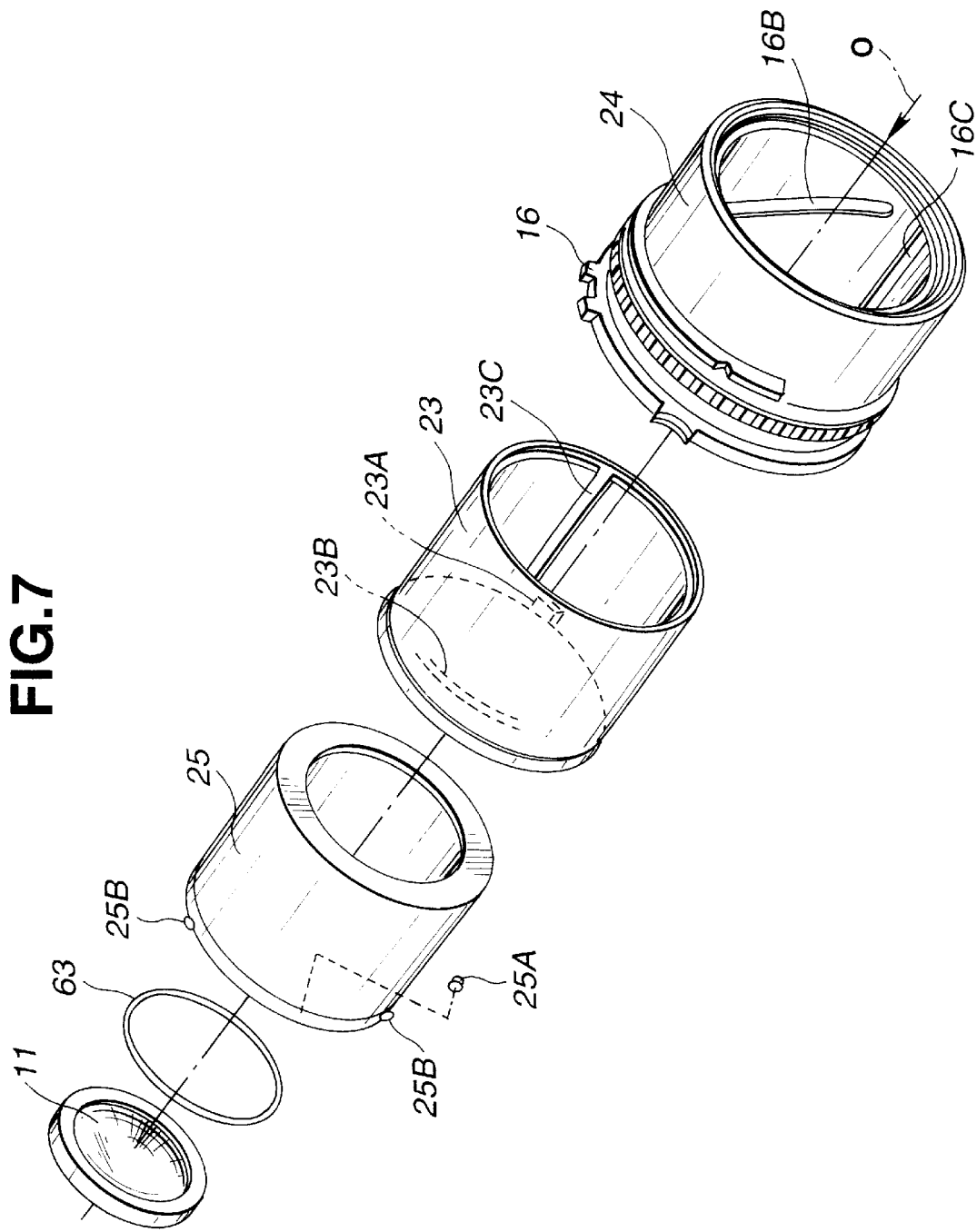
FIG. 7 is a part of an exploded perspective view of the zoom lens barrel in FIG. 1.
Figure 8A:
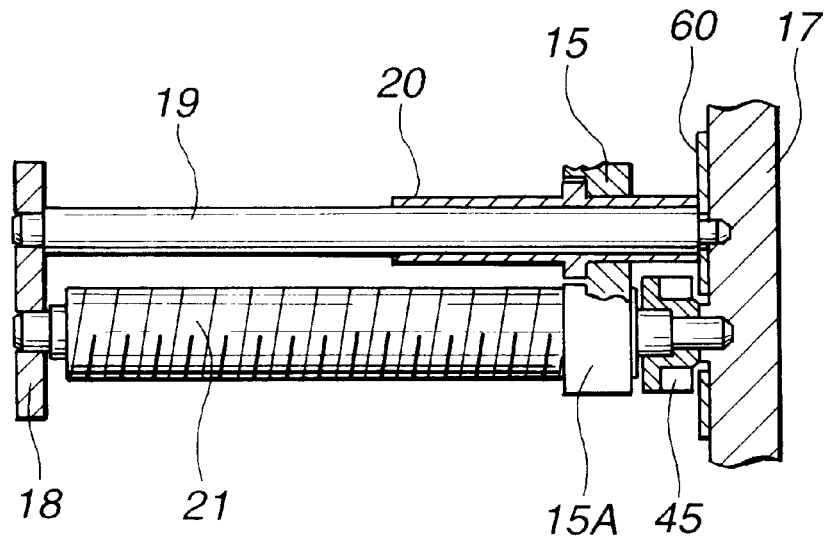
FIG. 8A is a sectional view of a retracted state that shows surroundings of a feed screw for driving a moving plate in the zoom lens barrel show in FIG. 1.
Figure 8B:
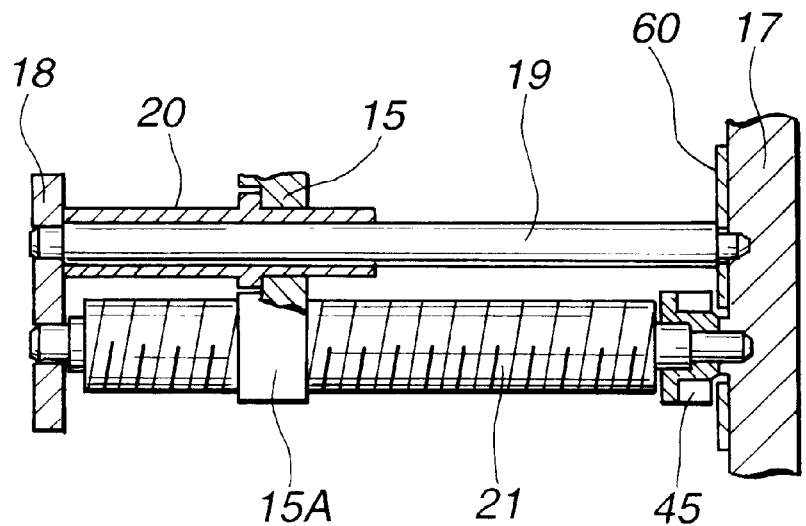
FIG. 8B is a sectional view of a shooting-ready state that shows surroundings of a feed screw for driving a moving plate in the zoom lens barrel show in FIG. 1.
Figure 9:
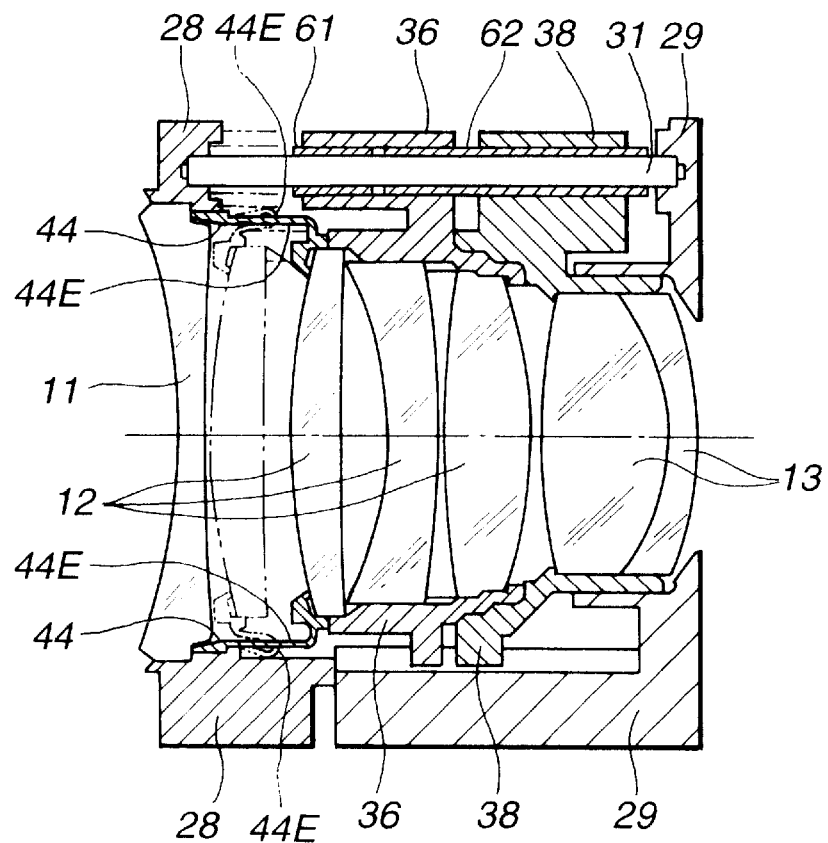
FIG. 9 is a sectional view showing surroundings of a supporting portion for first, second, and third lens group frames in the zoom lens barrel shown in FIG. 1.
Figure 10:
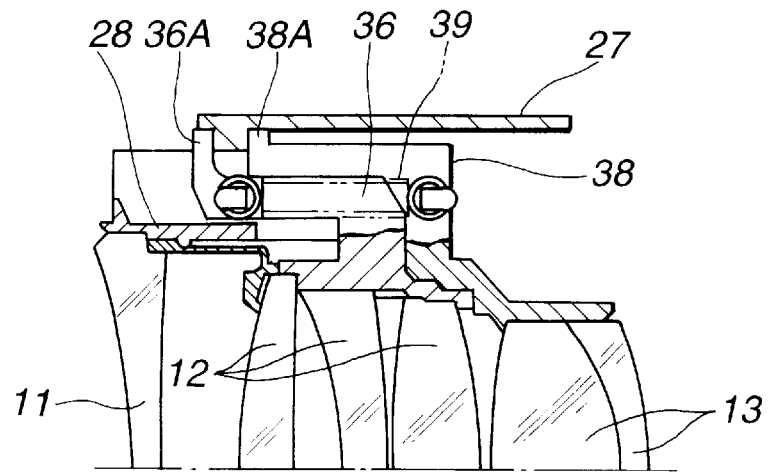
FIG. 10 is a sectional view showing a state of a lens group frame contacting with a three-dimensional cam in the zoom lens barrel shown in FIG. 1.
Figure 11:
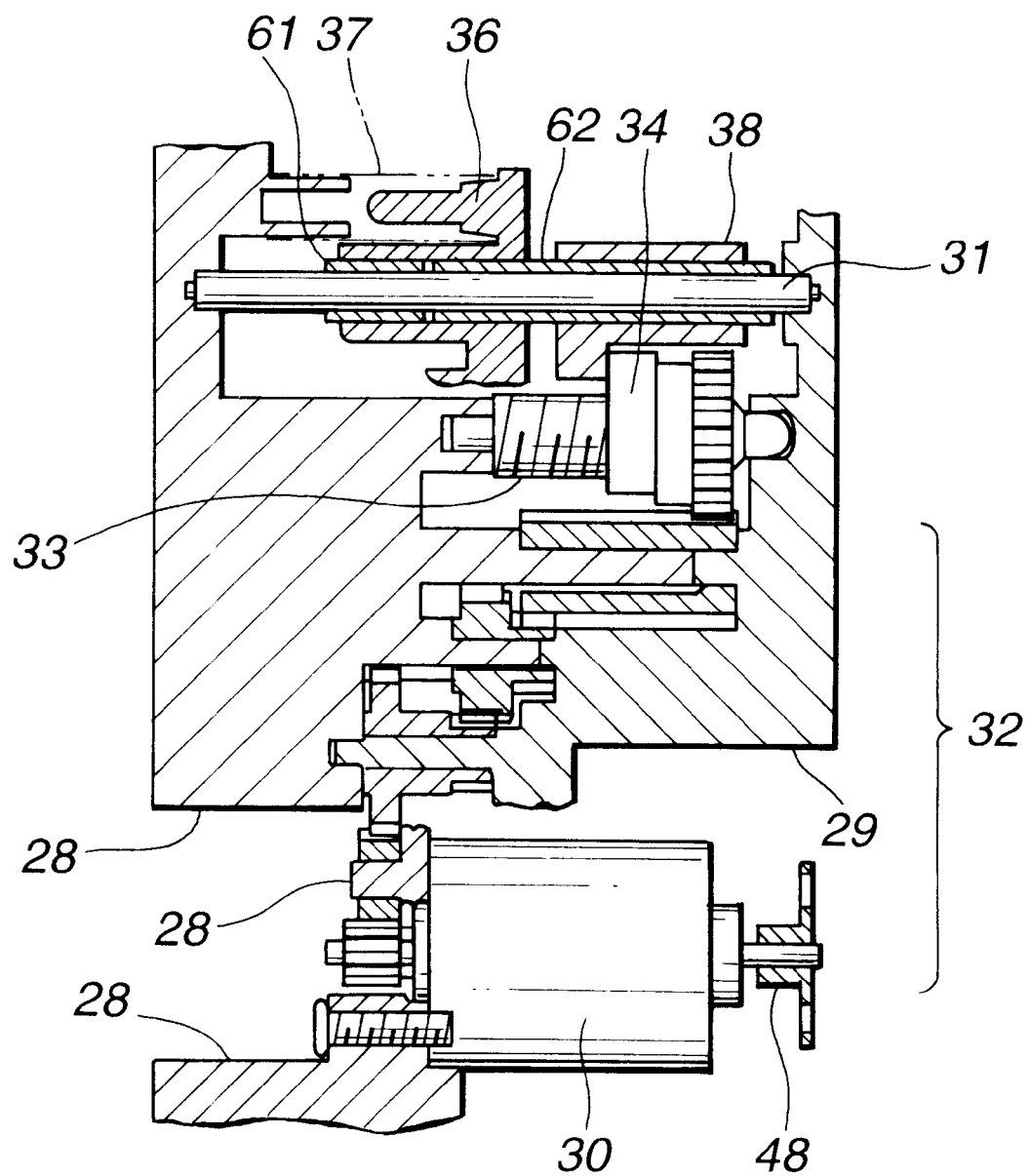
FIG. 11 is a developed sectional view showing a first lens group frame and a shutter base plate.

FIGS. 1–3 are central vertical sectional views in respective states of a lens barrel that is a first embodiment of the present invention. FIG. 1 shows the retracted state of the lens barrel contained in a camera body, FIG. 2 shows the shooting-ready state of a focusing group focused at the wide-angle end at infinity, and FIG. 3 shows the shooting-ready state of the focusing group focused at the telephoto end at infinity. In addition, FIG. 4 is a schematic diagram showing the movement of each lens group at the time of a zooming operation of the zoom lens barrel. FIGS. 5–7 are three drawings into which an exploded schematic diagram of the lens barrel is divided. FIGS. 8A–8B are sectional views showing the surroundings of a feed screw for a moving plate, FIG. 8A is a sectional view in the retracted state, and FIG. 8B is a sectional view in the shooting-ready state. FIG. 9 is a sectional view showing the surroundings of a supporting portion for first, second, and third lens group frames. FIG. 10 is a sectional view showing a state of a lens group frame contacting with a three-dimensional cam. FIG. 11 is a developed sectional view showing a first lens group frame and a shutter base plate.

As shown in FIGS. 1–3 and 5–7, the lens barrel mainly comprises: a first group lens frame 28 supporting the first lens group 11; a second group lens frame 36 supporting a second lens group 12; a third group lens frame 38 supporting a third lens group 13; a fourth group lens frame 26 supporting a fourth lens group 14; a moving frame 16 and a moving plate 15 that move when the lens barrel is switched from the retracted state to the shooting-ready state (wide-angle end to telephoto end); a rotating frame 24 being rotated at the time of zooming; a cam frame 22 that is a first cam; a guide frame 23; a first group zoom frame 25 supporting the first group lens frame 28; a three-dimensional cam 27 that is a second cam for changing a group interval between the second lens group 12 and third lens group 13 at the time of zooming; a sector 47; a shutter base plate 29 on which a solenoid 64 for driving the sector and the like is mounted; and a focusing motor 30 for focusing drive.

As a picture-taking optical system of this lens barrel, the first lens group 11, second lens group 12, third lens group 13, and fourth lens group 14 are located in order from the front. Furthermore, as shown in FIG. 4, the first lens group 11 and third lens group 13 move in the lens barrel as though in the manner of a one-piece structure. The second lens group 12 moves with relatively changing its position relative to the first lens group 11 and third lens group 13. In addition, the fourth lens group 14 relatively moves, changing its position relative to the third lens group 13.

Hereinafter, the construction of each portion will be described with reference to FIGS. 1, 5, and so on.

The back end portion of the moving frame 16 is fixed to the moving plate 15. In addition, a plate 60 fixed to a camera body 17, and a sleeve 20 that fits with a shaft 19 nipped by a bearing 18 fixed by the camera body 17 and is movable in the direction of the shaft are fixed on the moving plate 15 (see FIGS. 8A and 8B). Furthermore, the camera body 17 and a screw portion 15A thread-connecting to a feed screw 21 rotatably nipped by the bearing 18 fixed by the camera body 17 are provided on the moving plate 15 in one-piece. In the back end portion of the feed screw 21, a gear 45 for driving the feed screw 21 is coaxially located in one-piece.

A shielding rubber 51 that is elastic and is used for preventing the light except the picture-taking light from taking a roundabout way to an opening of the camera body 17 is located between the moving plate 15 and the opening of the camera body 17. In addition, a pawl 16D fitting with a groove 24A of the rotating frame 24 described later is formed on the front end of the moving frame 16.

The rotating frame 24 fits with the outer circumference of the moving frame 16, being rotatable around an optical axis, the position of the frame 24 in the direction of the optical axis being restricted by fitting of the pawl 16D and groove 24A. Furthermore, a gear 24C that is a gear for driving the zooming of the lens barrel is formed in one-piece in the outer circumference of the rotating frame 24.

Furthermore, a keyway 24D is formed in the outer circumference of the rotating frame 24, the keyway 24D which fits with a key 35 fixed to the camera body 17 at the time the camera is in the shooting-ready state. A straight groove 24E that fits with a projection 22A of a cam frame 22 described later and is movable toward the optical axis is formed in the inner circumference of the rotating frame 24. The shielding rubber 50 is fixed in the inner circumference of the front end of the rotating frame 24 to prevent light, water, dust and the like from invading its interior from between the rotating frame 24 and guide frame 23 described later.

Three cam followers 22B are formed in the back end portion of the cam frame 22, and a cam groove 16B formed in the inner circumference of the moving frame 16 fits with (i.e., receives) them. In addition, on the outer circumference of the cam frame 22, three cam grooves 22C fitting with three cam followers 25A of the first group zoom frame 25 described later are provided, and a keyway 22D that fits with a key portion 27A of the three-dimensional cam described later and movable toward the optical axis is also provided. Furthermore, two cam grooves 22E fitting with two cam followers 26A of the fourth lens frame 26 described later are formed in the inner circumference of the cam frame 22.

A projection 23A is formed in the back end portion of the guide frame 23, the projection 23A which fits with a straight groove 16C provided in the inner circumference of the moving frame 16. Furthermore, the guide frame 23 radially fits with the inner circumference of the moving frame 16. Since the projection 23A fits with the straight groove 16C as described above, the guide frame 23 can move only along the optical axis 0 against the moving frame 16. Moreover, a groove 23B is formed in the backend portion of the guide frame 23, groove 23B fits with (i.e., receives) a pawl portion 22F provided in the outer circumference of the cam frame 22. Therefore, the guide frame 23 can perform relative movement against the cam frame 22 only in the rotatory direction around the optical axis.

In addition, three straight grooves 23C that fit with three pawls 25B provided in the back end portion of the first group zoom frame 25 described later and are movable along the optical axis are formed in the inner circumference of the guide frame 23. Then, a shielding rubber 52 is fixed in the front end portion of the inner circumference of the guide frame 23 to prevent light, water, dust and the like from invading its interior from between the guide frame 23 and first zoom frame 25.

The cam followers 25A and pawl 25B are formed in the back end portion of the first group zoom frame 25, which fit with the cam groove 22C of the cam frame 22 and the straight groove 23C of the guide frame 23 respectively. In addition, the first group lens frame 28 holding the first lens group 11 is fixed to the first group zoom frame 25. Nevertheless, a rubber ring 63 is provided between the first group zoom frame 25 and first lens group 11 to fix the first lens group 11 and prevent the invasion of water and dust, due to its elasticity.

The shutter base plate 29, focusing motor 30 having a slit 48 for rotation detection that is fixed to its rotating shaft, and the like are fixed in the first group lens frame 28. In addition, as shown in the developed sectional view of FIG. 11, a guide shaft 31 of the second and third group lens frames, a focusing drive gear train 32, a focusing drive screw 33, and a focusing drive nut 34 are sandwiched between the first group lens frame 28 and shutter base plate 29. Furthermore, a photointerrupter (not shown) detecting the rotation of the focusing motor 30, and a solenoid 64 that is an actuator to open and close a sector 47 described later are fixed to the shutter base plate 29 (see FIG. 6).

In addition, a shielding member 44 having a flexible part 44E is provided between the first group lens frame 28 and second group lens frame 36 to prevent light from streaming from between the first and second group lens frames to the outside. Furthermore, the point 44C of the shielding member 44 functions as a diaphragm of the picture-taking light.

The second group lens frame 36, as shown in FIG. 9, holds the second lens group 12 and is supported in the state of being hung upon the guide shaft 31 via a sleeve 61 fixed. In addition, the third group lens frame 38 holds the third lens group 13, and is supported in the state of being hung upon the guide shaft 31 similar to the second group lens frame 36.

The three-dimensional cam 27 fits with the outer circumference of the first group lens frame 28 is movable in the rotatory direction around the optical axis and in the direction of the optical axis to change the group interval between the second lens group 12 and third lens group 13 at the time of zooming.

In addition, as shown in FIGS. 6 and 11, a compressed spring 37 that is an energizing means is provided between the second group lens frame 36 and first group lens frame 28 to urge three cam followers 36A of the second group lens frame into 36 contact with the three-dimensional cam 27. Furthermore, the three-dimensional cam 27 contacts the three arm portions 38A of the third group lens frame 38 with the force of the compressed spring 37 via the second group lens frame 36. Moreover, the third group lens frame 38 contacts the focusing drive nut 34 with the force of the compressed spring 37 via the three-dimensional cam 27.

In addition, as shown in FIGS. 6 and 10, a tension spring 39 that is an energizing means is provided at a position symmetrical to the compressed spring 37 with respect to the optical axis between the second group lens frame 36 and third group lens frame 38. The tension spring 39 urges the cam followers 36A of the second group lens frame 36 into contact with the three-dimensional cam 27 and further urges the three-dimensional cam 27 into contact with the arm portions 38A of the third group lens frame 38.

As described above, by making the compressed spring 37 and tension spring 39 act, three cam followers 36A of the second group lens frame 36 are assured to contact the three-dimensional cam 27 and the second group lens frame 36 is held in a correct posture.

The fourth group lens frame 26 holds the fourth lens group 14 as shown in FIG. 1 and the like. Furthermore, similarly, a shaft 40 is fixed to the fourth lens group 26 parallel to the optical axis 0. The shaft 40 fits into a hole 29A of the shutter base plate 29, being movable along the optical axis, and hence the fourth group lens frame 26 is supported in the state of being hung by the shutter base plate 29. A compressed spring 43 are provided between the fourth group lens frame 26 and shutter base plate 29 to make the cam followers 26A, which are formed with the fourth group lens frame 26 in a one-piece manner, contact the cam groove 22E of the cam frame 22.

A plurality of sectors 47 limiting quantity of light by shielding or opening the opening 29B into which a picture-taking beam passing through the picture-taking optical system enters, and a cover 46 holding these sectors 47 are provided in the back end surface of the shutter base plate 29.

Picture-taking preparatory operation of that the lens barrel of this embodiment having the construction that is described above, transfers from the retracted state to the shooting-ready state, zooming operation, and focusing operation will be described below.

First, when a power switch of a camera that is not shown is turned on, a rotation drive force is transferred to the gear 45 fixed to the feed screw 21 by a drive means (not shown) provided in the camera body to rotate the feed screw 21 (see FIGS. 8A and 8B).

When the feed screw 21 rotates, the drive force is transmitted to the screw portion 15A thread-connecting to the feed screw 21, and hence the moving plate 15 moves outward along the optical axis 0. The rotation of the feed screw 21 stops when the bearing 18 contacts the sleeve 20 (FIG. 8B), and next, the rotation drive force is transmitted to the gear 24C of the rotating frame 24 by drive means (not shown) provided in the camera body.

When the rotating frame 24 rotates through a predetermined angle, about 10°, the keyway 24D of the rotating frame 24 fits with the key 35 fixed to the camera body 17, and hence the posture of the rotating frame 24 is regulated by the key 35. Since the lens barrel is set in this state at the zoom wide-angle end that is shooting-ready, the picture-taking preparatory operation is completed.

When zooming operation is performed after completion of picture-taking preparatory operation, the rotation drive force is transmitted to the gear 24C of the rotating frame 24 by the drive means (not shown) provided in the camera body. Therefore, the force rotationally drives the rotating frame 24. Since the straight groove 24E formed in the inner circumference of the rotating frame 24 fits with the projection 22A of the cam frame 22 with being movable toward the optical axis, the cam frame 22 also rotates, due to the interlocking, with the rotation of the rotating frame 24.

In addition, since the cam followers 22B of the cam frame 22 fits with the cam groove 16B in the inner circumference of the moving frame 16, the cam frame 22 moves along the optical axis 0 by the cam groove 16B of the moving frame 16. Thus, in company with the rotation of the rotating frame 24, the cam frame 22 moves along the optical axis 0 with rotating.

Due to interlocking, with the movement of the cam frame 22 along the optical axis 0, the guide frame 23, which is supported so as to be capable of only rotating around the optical axis 0 against the cam frame 22, also moves along the optical axis. Since the position of the guide frame 23 in the rotating direction around the optical axis 0 is regulated by the projection 23A of the guide frame 23 fitting with the straight groove 16C of the moving frame 16, the guide frame 23 does not rotate.

Since the first group zoom frame 25 fits with the cam 22C of the cam frame 22 via the cam followers 25A and also fits with the straight groove 23C of the guide frame 23 via the pawl 25B, the frame 25 moves along the optical axis 0 by the rotation of the cam frame 22. In company with the movement of this first group zoom frame 25, the first group lens frame 28, shutter base plate 29, second group lens frame 36, third group lens frame 38, and three-dimensional cam 27 move along the optical axis 0.

In addition, since the position in the rotatory direction of the three-dimensional cam 27 is regulated against the cam frame 22 by the key portion 27A, the three-dimensional cam 27 rotates around the optical axis 0 in interlocking relationship with the rotation of the cam frame 22. Interlocking with the rotation of this three-dimensional cam 27, the second group lens frame 36 contacting the three-dimensional cam 27 moves along optical axis 0, and hence the interval between the second lens group 12 and third lens group 13 is changed.

The fourth group lens frame 26 is supported against the shutter base plate 29 with being hung and is movable along the optical axis 0, and contacts, via the cam followers 26A, the cam groove 22E in the inner circumference of the cam frame 22. Therefore, by the rotation of the cam frame 22, the fourth group lens frame 26 moves toward the optical axis 0, changing the interval between the third lens group 13 and fourth lens group 14.

As described above, due to the interlocking relationship with the rotatory operation of the rotating frame 24, the first lens group 11, second lens group 12, third lens group 13, and fourth lens group 14 are moved along the optical axis according to the cam patterns of the cam 16B in the inner circumference of the moving frame 16, the cam 22C in the outer circumference and the cam 22E in the inner circumference of the cam frame 22, and the three-dimensional cam 27, and hence zooming is performed.

Next, when focusing is performed, first, the focusing motor 30 is rotated. The rotation control of the focusing motor 30 is performed by the CPU and the like that process an output of the photointerrupter (not shown) in company with the rotation of the slit 48 but are not shown.

The rotation drive force of the focusing motor 30 is transmitted to the focusing drive screw 33 by the focusing drive gear train 32 (see FIG. 11). The focusing drive nut 34 is thread-connected to the focusing drive screw 33 in such a state that the position in the rotatory direction of the nut 34 is regulated against the shutter base plate 29. Therefore, the nut 34 moves forward in interlocking relationship with the rotation of the focusing drive screw 33. Since the third group lens frame 38 contacts the focusing drive nut 34, the third group lens frame 38 moves along the optical axis in company with the advancing operation of the focusing drive nut 34.

When the third group lens frame 38 moves along the optical axis, the three-dimensional cam 27 contacting the arm portions 38A of the third group lens frame 38 with the force of the tension spring 39 and the second group lens frame 36 contacting the three-dimensional cam 27 move along the optical axis 0 similarly. In addition, the second group lens frame 36 and third group lens frame 38 move along the optical axis 0 as though in a one-piece manner by a focusing adjustment shift without changing the mutual interval determined in the zooming operation. FIG. 9 shows the outlined positions and shapes of the second group lens frame 36, second lens group 12, and shielding member 44 at the time when focusing at the closest distance is performed at the wide-angle end, in dotted lines.

According to the lens barrel of the first embodiment described above, in an optical system of a zoom lens having a plurality of lens groups that change mutual intervals at the time of the zooming operation and are driven as though one-piece at the time of the focusing operation, it becomes possible to keep positions of lens groups driven at the time of focusing operation highly accurate and to make its radial size small.

Thus, by providing the three-dimensional cam 27 that rotates around the optical axis at the time of the zooming operation and moves along the optical axis at the time of the focusing operation and by locating the three-dimensional cam 27 in front of the cam frame 22 that rotates around the optical axis at the time of the zooming operation and does not move at the time of the focusing operation, it becomes possible suppress an increase of the radial size. In addition, since the three-dimensional cam 27 can be efficiently located in a space constructed by the lens groups and cam frame 22, it becomes possible to realize a zoom lens barrel that is compact as a whole.

Next, a zoom lens barrel of a second embodiment of the present invention will be described.

The zoom lens barrel of this embodiment is different in a holding method of a second group lens frame from that of the first embodiment, and other construction and actions are the same as those of the first embodiment. Therefore, here, only the difference will be described.

Figure 12:
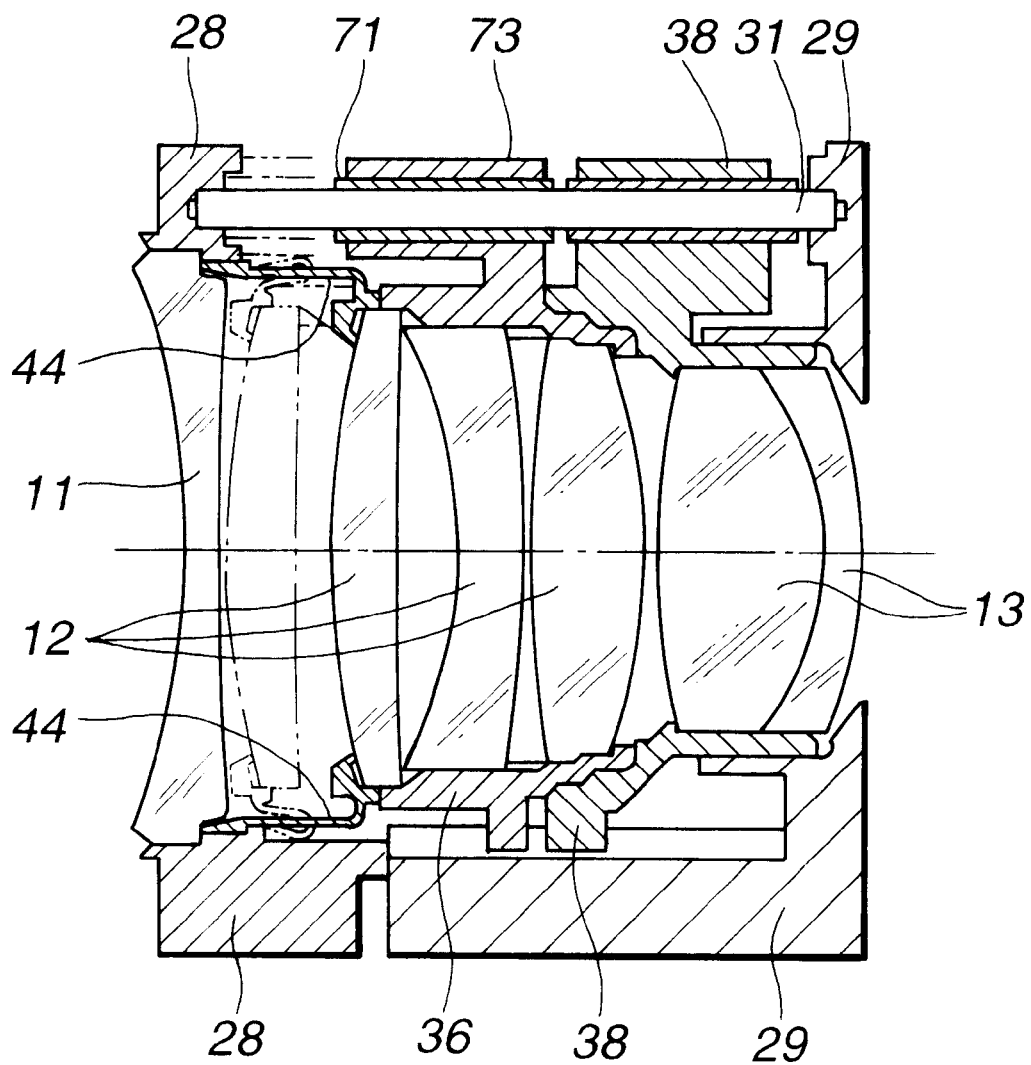
FIG. 12 is a vertical sectional view showing the surroundings of a lens frame supporting portion of a zoom lens barrel that is a second embodiment of the present invention.

FIG. 12 is a sectional view showing the surroundings of a lens-frame-supporting portion of the zoom lens barrel that is the second embodiment. As shown in this drawing, in this zoom lens barrel, a sleeve 71 fixed to a second group lens frame 73 has a fitting length with a guide shaft 31 which is longer than that of the sleeve 61 in the lens barrel of the first embodiment. By making the sleeve 71 be in such a fitting state, it becomes possible to keep the posture of the second group lens frame 73 nearly upright.

Figure 13:
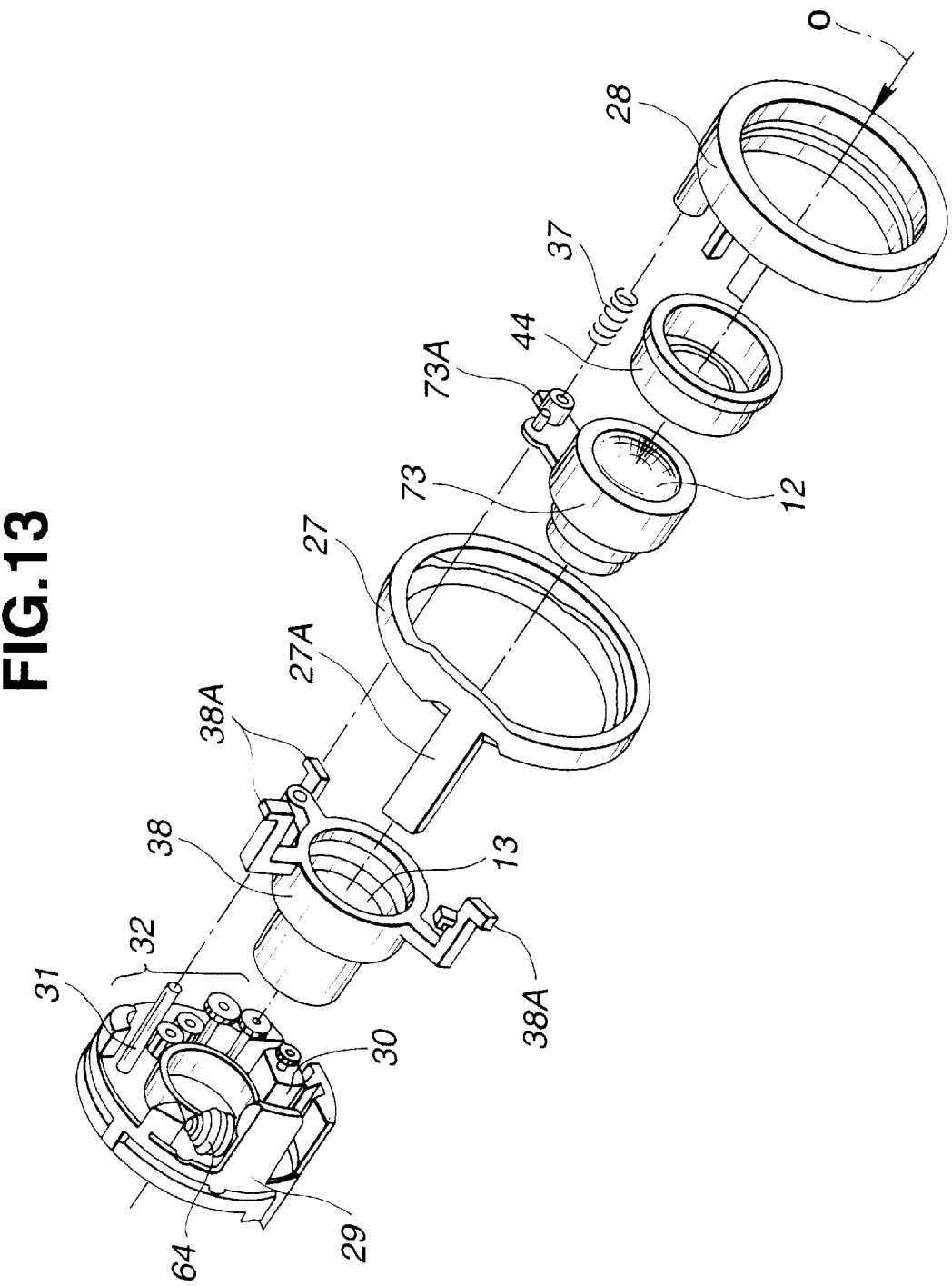
FIG. 13 is an exploded perspective view showing the surroundings of a three-dimensional cam of the zoom lens barrel in FIG. 12.

Therefore, the only task of the three-dimensional cam 27 (see FIG. 6) is to define the interval between the second group lens frame 73 and third group lens frame 38, and the only task of the second group lens frame 73 is make a cam follower 73A contact the three-dimensional cam 27. In addition, the compression spring 37 is needed as a spring energizing the second group lens frame 73, and hence the tension spring 39 is unnecessary (see the exploded perspective view of FIG. 13).

As described above, according to the zoom lens barrel of the second embodiment, besides effects similar to those of the first embodiment, the second group lens frame has only one cam follower, and only one spring for energizing. Therefore, this has such effects that construction becomes simple as a whole to become advantageous in a space and cost.

What is claimed is:

1. A zoom lens barrel having a plurality of lens groups that change intervals in direction of an optical axis at a time of a zooming operation and move in a one-piece manner along the optical axis at a time of a focusing operation thereby fixing mutual intervals said lens groups in the direction of the optical axis, the zoom lens barrel having:

a three-dimensional cam rotatable at least around the optical axis during the zoom operation and is movable at least along the optical axis without rotating during the focusing operation;

a lens frame that has a cam follower contacting an end surface of said three-dimensional cam and holds one of said plurality of lens groups; and means for urging said lens frame toward said three-dimensional cam to maintain engagement between the cam follower and the three-dimensional cam.

2. A zoom lens barrel according to claim 1 further including means for rotating said three-dimensional cam responsive to a zooming operation.

3. A zoom lens barrel according to claim 1 further comprising means for moving the lens frame having a cam follower contacting an end surface of said three-dimensional cam in an axial direction responsive to a focusing operation.

4. A zoom lens barrel according to claim 1 further comprising:

means for moving lens frame having a cam follower contacting an end surface of said three-dimensional cam in the axial direction responsive to a focusing operation;

a shaft provided in said lens barrel and arranged to one side of said optical axis and being parallel therewith;

means on at least one of said lens frames for slidably mounting one of said lens frames upon said shaft;

a compression spring arranged along an axis parallel to and displaced from the optical axis for urging said one of said lens frames into engagement with said three-dimensional cam;

said means for slidably mounting said one of said lens frames upon said shaft having a length in the axial direction sufficient to maintain alignment of said one of said lens frames with said optical axis during movement along said optical axis whereby said compression spring, although offset from said optical axis, urges said cam followers of said one of said lens frames into engagement with one of the cam surfaces of said three-dimensional cam while said means for slidably mounting maintains proper alignment of said lens frame relative to said optical axis.

5. A zoom lens barrel having a plurality of lens groups that change intervals in a direction of an optical axis at a time of zooming operation and move in a one-piece manner along the optical axis at a time of a focusing operation thereby fixing mutual intervals between said lens groups in the direction of the optical axis, the zoom lens barrel having:

a three-dimensional cam rotatable at least around the optical axis during the zooming operation and is movable at least along the optical axis without rotating during the focusing operation.

6. A zoom lens barrel according to claim 5, wherein said three-dimensional cam is urged by means for urging a lens to maintain engagement between the cam and one of said lens groups.

7. A zoom lens barrel according to claim 5, wherein said three-dimensional cam is held by a frame holding a lens.

8. A zoom lens barrel according to claim 5, wherein said three-dimensional cam regulates an interval between a second lens group and a third lens group among four zoom lens groups.

9. A zoom lens barrel according to claim 5 further comprising means for moving the lens frame having a cam follower contacting an end surface of said three-dimensional cam in an axial direction responsive to a focusing operation.

10. A zoom lens barrel having a plurality of lens groups that change intervals in a direction of an optical axis at a time of a zooming operation and move in one-piece toward the optical axis at a time of a focusing operation thereby fixing mutual intervals between said lens groups in the direction of the optical axis, the zoom lens barrel having:
   a first cam rotatable at least around the optical axis during the zooming operation and which does not move during the focusing operation; and
   a second cam that rotates at least around the optical axis during the zooming operation and moves at least along the optical axis without rotating during the focusing operation.

11. A zoom lens barrel according to claim 10, wherein said second cam is guided by said first cam.

12. A zoom lens barrel according to claim 10 further comprising means for moving the lens frame having a cam follower contacting an end surface of said three-dimensional cam in an axial direction responsive to a focusing operation.

13. A zoom lens barrel having a plurality of lens groups that change intervals in a direction of an optical axis at time of a zooming operation and move in a one-piece manner along the optical axis at a time of a focusing operation thereby fixing mutual intervals between said lens groups in the direction of the optical axis, the zoom lens barrel having:
   a first cam rotatable at least around the optical axis during the zooming operation and which does not move during the focusing operation;
   a second cam that rotates at least around the optical axis during the zooming operation and moves at least along the optical axis without rotating during the focusing operation;
   a lens frame that has a cam follower contacting and end surface of said second cam and holds one of said plurality of lens groups; and
   means for urging said second cam toward said first cam via said lens frame.

14. A zoom lens barrel according to claim 13 further comprising means for moving the lens frame having a cam follower contacting an end surface of said three-dimensional cam in an axial direction responsive to a focusing operation.

15. A lens barrel that can change a focal length including:
   a focusing lens moving along an optical axis in company with said change of the focal length; and
   a cam member that constantly contacts the focusing lens, moves the focusing lens along the optical axis when the cam member is rotated, and is moved along the optical axis without rotating at a time the focusing is lens moving for focusing.

16. A zoom lens barrel according to claim 15 further comprising means for moving the lens frame having a cam follower contacting an end surface of said three-dimensional cam in an axial direction responsive to a focusing operation.

17. A zoom lens barrel having a plurality of lens groups that change intervals in a direction of an optical axis at a time of a zooming operation and move in a one-piece manner along the optical axis at a time of a focusing operation thereby fixing mutual intervals between said lens groups in the direction of the optical axis, the zoom lens barrel having:
   a three-dimensional cam;
   first and second lens frames having cam followers engaging opposing ends surfaces of said three-dimensional cam and each holding one of said plurality of lens groups;
   first bias means for urging said first lens frame toward said three-dimensional cam to maintain engagement between the cam followers of said first lens frame and one cam surface of said three-dimensional cam;
   second bias means coupled to the first and second lens frames on opposite sides of said three-dimensional cam for urging said fist and second lens frames into engagement with another cam surface of said three-dimensional cam opposite said one cam surface;
   said first and second bias means lying substantially along a common diameter line passing through said optical axis and further being arranged equal distances on opposite sides of said optical axis so as to provide symmetrical biasing forces.

18. A lens barrel that can change a focal length including:
   a focusing lens moving in a direction of an optical axis without rotating in company with a change of the focal length; and
   a cam member that constantly contacts the focusing lens, moves the focusing lens in said direction of the optical axis by rotating in company with said change of the focal length, and is moved along the optical axis without rotating at a time the focusing lens is moving for focusing.

19. A zoom lens barrel according to claim 18 further comprising means for moving the lens frame having a cam follower contacting an end surface of said three-dimensional cam in an axial direction responsive to a focusing operation.

20. A lens barrel having a plurality of lens groups including a cam member that is directly sandwiched between two lens groups and directly changes a separation distance between said two lens groups when said cam member is rotated, said two lens groups moving in a one-piece manner along an optical axis at a time of focusing and moving said cam member in the same direction.

21. A zoom lens barrel according to claim 20 further comprising means for moving the lens frame having a cam follower contacting an end surface of said three-dimensional cam in an axial direction responsive to a focusing operation.

22. A lens barrel having a plurality of lens groups including:
   a first drive mechanism;
   a second drive mechanism;
   a cam member that is rotated by said first drive mechanism and changes an interval between a plurality of frame members when said cam member is rotated; and
   said frame members being linearly driven by said second drive mechanism and linearly moving said cam member in company with linear movement of said frame members.

23. A lens barrel according to claim 22, wherein said first drive mechanism is a zoom drive mechanism.

24. A lens barrel according to claim 22, wherein said second drive mechanism is a focus drive mechanism.

25. A zoom lens barrel according to claim 22 further comprising means for moving the lens frame having a cam follower contacting an end surface of said three-dimensional cam in an axial direction responsive to a focusing operation.

* * * * *